US012237129B2

(12) United States Patent
Cheng et al.

(10) Patent No.: US 12,237,129 B2
(45) Date of Patent: Feb. 25, 2025

(54) PROCESSING METHOD FOR PREVENTING ELECTROMAGNETIC INDUCTION WHEN MAIN SYSTEM AND STANDBY SYSTEM OF SAFETY DRIVE UNIT CO-DRIVE RELAY

(71) Applicant: CASCO SIGNAL CO., LTD., Shanghai (CN)

(72) Inventors: Siyuan Cheng, Shanghai (CN); Tao Zhang, Shanghai (CN); Zhijun Ji, Shanghai (CN); Mingwang Xu, Shanghai (CN); Limin Ning, Shanghai (CN); Chao Li, Shanghai (CN); Mingling Zhu, Shanghai (CN); Lifan Yin, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 0 days.

(21) Appl. No.: 17/792,508

(22) PCT Filed: Sep. 18, 2021

(86) PCT No.: PCT/CN2021/119227

§ 371 (c)(1),
(2) Date: Jul. 13, 2022

(87) PCT Pub. No.: WO2022/267245

PCT Pub. Date: Dec. 29, 2022

(65) Prior Publication Data

US 2024/0177953 A1 May 30, 2024

(30) Foreign Application Priority Data

Jun. 22, 2021 (CN) ............................ 202110692230

(51) Int. Cl.
*H01H 47/02* (2006.01)
*H01H 47/00* (2006.01)

(52) U.S. Cl.
CPC .......... *H01H 47/02* (2013.01); *H01H 47/002* (2013.01)

(58) Field of Classification Search
CPC .... H01H 47/00; H01H 47/001; H01H 47/002; H01H 47/003; H01H 47/004;
(Continued)

(56) References Cited

U.S. PATENT DOCUMENTS

| | | | | |
|---|---|---|---|---|
| 10,424,449 | B2 | 9/2019 | Nishio | |
| 2013/0114176 | A1 * | 5/2013 | Marmonier .......... | H01H 47/002 361/87 |
| 2018/0315565 | A1 | 11/2018 | Zhang et al. | |

FOREIGN PATENT DOCUMENTS

| | | | |
|---|---|---|---|
| CN | 105103256 | A | 11/2015 |
| CN | 106406138 | A | 2/2017 |

(Continued)

OTHER PUBLICATIONS

English translation of CN106406138. (Year: 2017).*
(Continued)

*Primary Examiner* — Harry R Behm
*Assistant Examiner* — Carlos O Rivera-Perez
(74) *Attorney, Agent, or Firm* — Amster, Rothstein & Ebenstein LLP

(57) ABSTRACT

A processing method for preventing electromagnetic induction when a main system and a standby system of a safety drive unit co-drive a relay. The method includes the following steps: periodically acquiring and detecting a drive command; detecting a port state of an output port of a safety drive unit when the drive command changes; performing a corresponding processing operation according to the port state of the output port; and repeating the foregoing steps.

4 Claims, 3 Drawing Sheets

(58) Field of Classification Search
CPC .... H01H 47/005; H01H 47/006; H01H 47/02; H01H 47/04–20; H01H 47/22–226; H01H 47/32; H01H 47/325; H01H 47/36; H01H 50/00; H01H 50/44; H01H 50/443; H01H 2009/00; H01H 2009/0083; B61L 19/00; B61L 19/06; B61L 19/065; B61L 19/08; B61L 19/14; B61L 19/16; B61L 27/00; B61L 27/30; B61L 27/33; B61L 27/37
USPC .... 361/71, 72–75, 78, 79, 86, 87, 93.1–102, 361/115, 139, 143–145, 160, 166–169.1, 361/170, 171, 172, 187, 189–193, 361/195–198, 206–210
See application file for complete search history.

(56) References Cited

FOREIGN PATENT DOCUMENTS

| | | | |
|---|---|---|---|
| CN | 107942646 | A | 4/2018 |
| EP | 3396692 | A1 | 10/2018 |

OTHER PUBLICATIONS

China National Intellectual Property Administration, (First) Search Report for China Patent Application No. 202110692230.9, Dec. 28, 2021, 3 pp., China.
China National Intellectual Property Administration, (Second) Search Report for China Patent Application No. 202110692230.9, May 30, 2022, 3 pp., China.
International Search Report for PCT/CN2021/119227, Mar. 3, 2022, 4 pp., China.
Written Opinion of the International Searching Authority for PCT/CN2021/119227, Mar. 3, 2022, 3 pp., China.

* cited by examiner

PROCESSING METHOD FOR PREVENTING ELECTROMAGNETIC INDUCTION WHEN MAIN SYSTEM AND STANDBY SYSTEM OF SAFETY DRIVE UNIT CO-DRIVE RELAY

CROSS-REFERENCE TO RELATED APPLICATIONS

This application is a U.S. national stage entry under 35 U.S.C. § 371 of PCT International Patent Application No. PCT/CN2021/119227, filed Sep. 18, 2021, which claims priority to Chinese Patent Application No. 202110692230.9, filed Jun. 22, 2021, the contents of each of which are incorporated herein by reference in their entirety.

FIELD OF TECHNOLOGY

The present invention relates to the field of relay driving, in particular to a processing method for preventing electromagnetic induction when a main system and a standby system of a safety drive unit co-drive a relay.

BACKGROUND

In the railway signal system, the trackside safety drive unit is configured to perform control commands of an interlocking machine, and output a 24 V direct current (DC) to drive a gravitation type relay of the 6502 relay circuit.

To improve the response speed, two safety drive units that are redundant to each other, generally, do not perform delay driving, but externally output driving power once receiving a drive command. Conventional gravitation type relays are subject to cost considerations, and generally, two drive electric coils are partially wound on a same iron core. As a result, when the relay is driven by a main system board of a redundant system, after the armature is energized, the conducted 24 V DC causes the iron core to generate an induced electromotive force. In addition, if the safety drive unit standby system and the main system drive the relay at the same time, the port state of the output port is detected to be abnormal.

SUMMARY

An objective of the present invention is to provide a processing method for preventing electromagnetic induction when a main system and a standby system of a safety drive unit co-drive a relay. The safety drive unit first detects a port state of an output port when a drive command changes, and performs the next processing operation according to the port state. The safety drive unit performs external driving operations only after the port state is normal. The safety drive unit is guided to a safety side method after the port state is detected to be abnormal, which further ensures drive safety.

To achieve the foregoing objective, the present invention is implemented by using the following technical solutions.

The processing method for preventing electromagnetic induction when a main system and a standby system of a safety drive unit co-drive a relay includes:

S102, Periodically acquiring and detecting a drive command;

S103, Detecting a port state of an output port of a safety drive unit when the drive command changes; and

S104, Performing a corresponding processing operation according to the port state of the output port; and repeating steps S102-S104.

Optionally, step S104 includes:

when the port state is detected to be normal, enabling all switches at the output ports of the safety drive unit to perform actions, enabling the safety drive unit to perform external output operations, and repeating the detection processing step.

Optionally, the enabling the safety drive unit to perform external output operations specifically includes that the safety drive unit performs external driving operations or stops driving according to a drive command.

Optionally, the safety drive unit includes a safety drive unit main system and a safety drive unit standby system, where the safety drive unit main system is connected to a first coil via an output switch A1 and an output switch B1 respectively, and the safety drive unit standby system is connected to a second coil via an output switch A2 and an output switch B2 respectively, and a control logic of the safety drive unit main system is the same as a control logic of the safety drive unit standby system.

Optionally, step S104 includes:

in the safety drive unit main system, when the port state is detected to be abnormal, and if the drive command changes from "stop" to "drive" and such a cycle is within a set forgiveness cycle, ignoring a current detection result of this cycle, closing the output switch A1, opening the output switch B1, enabling the safety drive unit main system not to perform external driving operations, and waiting for a next cycle to detect again.

Optionally, the method further includes: in the safety drive unit main system, when the port state is detected to be normal within the set forgiveness cycle, closing the output switch B1, and enabling the safety drive unit main system to perform external output operations.

Optionally, step S104 includes:

in the safety drive unit main system, when the port state is detected to be abnormal, and if the drive command changes from "stop" to "drive" and such a cycle is out of a set forgiveness cycle, opening the output switch A1 and the output switch B1, and enabling the safety drive unit main system to cut off the output thereof to enter an unavailable state.

Optionally, step S104 includes:

in the safety drive unit main system, when the port state is detected to be abnormal, and if the drive command changes from "drive" to "stop", opening the output switch A1 and the output switch B1, and enabling the safety drive unit main system to cut off the output thereof to enter an unavailable state.

Optionally, before the periodically acquiring and detecting a drive command, the method further includes:

S101, Enabling the safety drive unit to load configuration data and to initialize hardware and software resources.

Optionally, the first coil connected to the safety drive unit main system and the second coil connected to the safety drive unit standby system are wound on a same iron core, and the relay can be driven in case that any one of safety drive units performs external output operations.

Compared with the prior art, the present invention has the following advantages.

In the processing method for preventing electromagnetic induction when a main system and a standby system of a safety drive unit co-drive a relay provided by the present invention, the safety drive unit first detects a port state of an output port when a drive command changes, and performs the next processing operation according to the port state. The safety drive unit performs external driving operations only after the port state is normal. The safety drive unit is guided to a safety side method after the port state is detected to be abnormal, which further ensures drive safety. The method can make the redundant systems co-drive the same relay without delay, avoiding that the ports are detected to be abnormal.

DETAILED DESCRIPTION OF THE EMBODIMENTS

To facilitate understanding of the features, content and advantages of the present invention and the effects that can be achieved, the present invention is described below in detail with reference to implementations and accompanying drawings. The accompanying drawings used herein are intended to only illustrate and assist this specification and do not necessarily show the real scales and precise configurations of the present invention after the implementation. Therefore, the scope of the claims in the present invention is not limited by the interpretation of the scale and configuration relationships.

It should be noted that the accompanying drawings are in a simplified form and in inaccurate scales, and are only used to conveniently and clearly describe the embodiments of the present invention.

Figure 1:
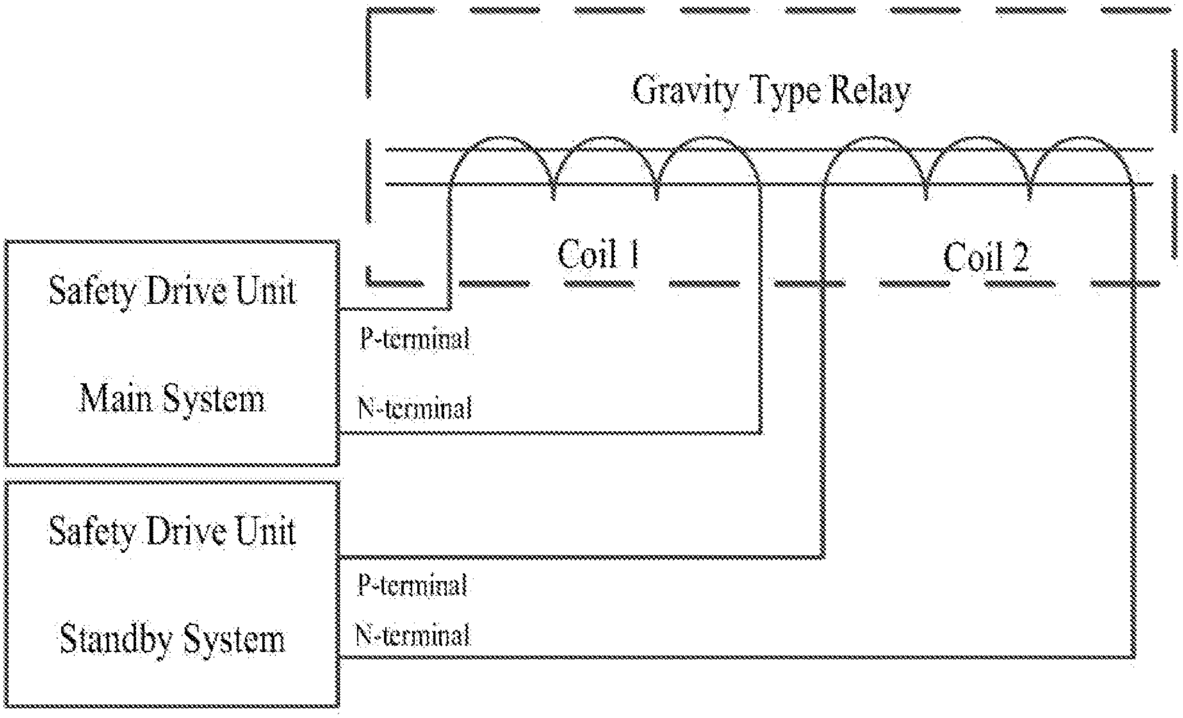
FIG. 1 is a schematic diagram in which a safety drive unit drives a gravitation type relay according to the present invention.
Figure 2:
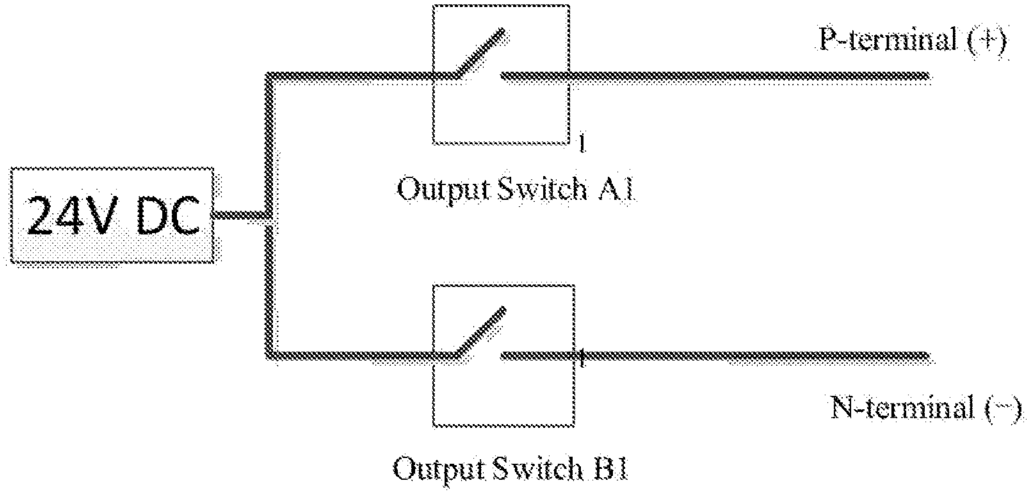
FIG. 2 is a schematic diagram of output ports of a safety drive unit main system according to the present invention.

As shown in FIG. 1 and FIG. 2, in this embodiment, the safety drive unit drives a gravitation type relay. The safety drive unit includes a safety drive unit main system and a safety drive unit standby system that are in a redundant co-drive mode. The safety drive unit main system is connected to a first coil via an output switch A1 and an output switch B1 respectively (the output switch A1 is on a P-terminal line, the output switch B1 is on the N-terminal line, and the switches are not shown in FIG. 1). The safety drive unit standby system is connected to a second coil via an output switch A2 and an output switch B2 respectively (the output switch A2 is on a P-terminal line, and the output switch B2 is on the N-terminal line). Each of the safety drive unit main system and the safety drive unit standby system performs output operations through two ports. The safety drive unit main system performs external driving only after the output switch A1 and the output switch B1 are closed. The same goes for the safety drive unit standby system. Terminals of the same ports of the safety drive unit main system and the safety drive unit standby system are connected to different driving electric coils of the same relay. A first coil, that is, a coil 1 connected to the safety drive unit main system and a second coil, that is, a coil 2 connected to the safety drive unit standby system are wound on the same iron core. The relay can be driven in case that any safety drive unit performs external output operations. A control logic of the safety drive unit main system is the same as that of the safety drive unit standby system.

Figure 3:
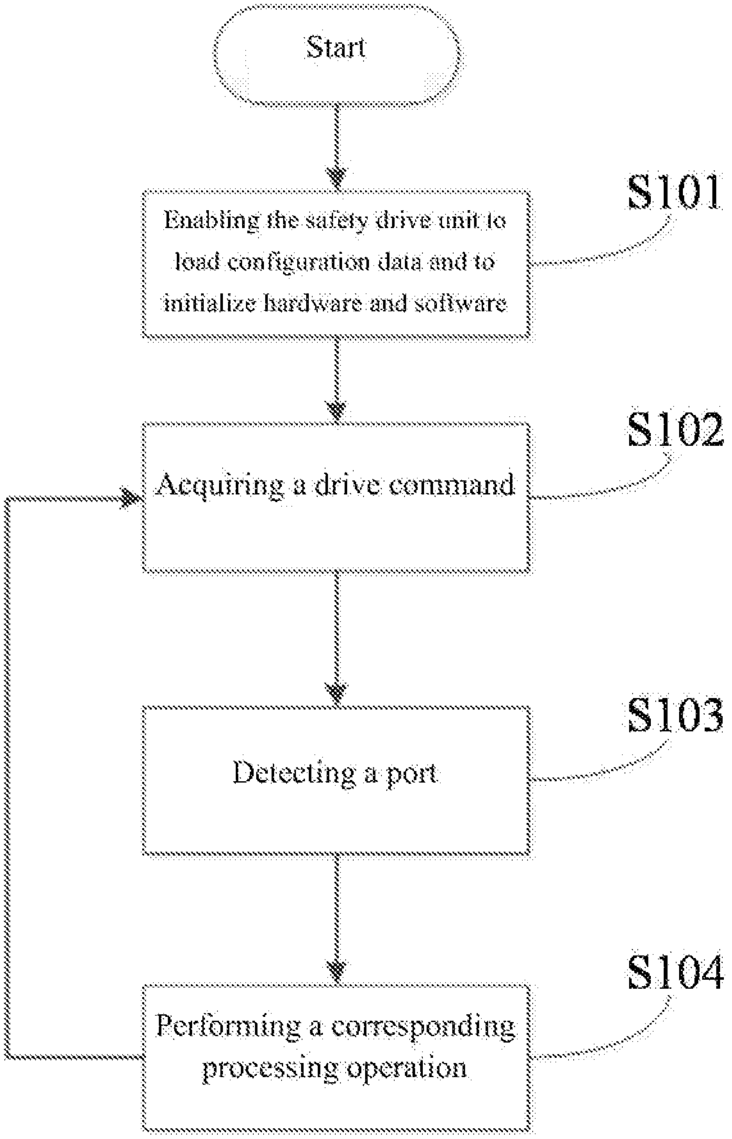
FIG. 3 is a schematic diagram of a main process of a processing method for preventing electromagnetic induction when a main system and a standby system of a safety drive unit co-drive a relay.
Figure 4:
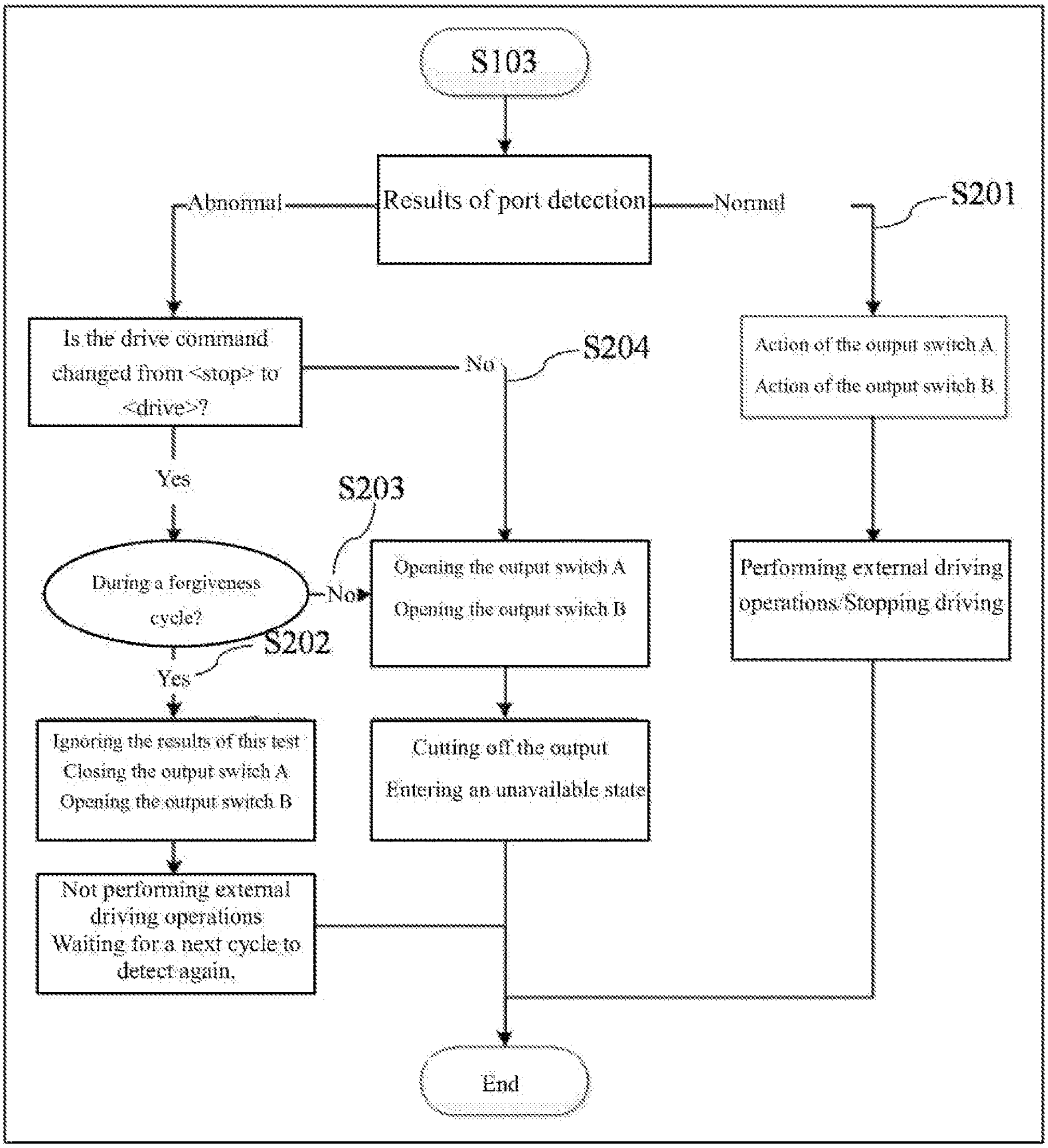
FIG. 4 is a schematic diagram of a partial process of the processing method for preventing electromagnetic induction of a main-standby co-drive relay of a safety drive unit.

As shown in FIG. 3 and FIG. 4, the processing method for preventing electromagnetic induction when a main system and a standby system of a safety drive unit co-drive a relay includes:

S101, Enabling the safety drive unit to load configuration data and to initialize hardware and software resources.

S102, Periodically acquiring a drive command from a safety communication module and detecting the drive command.

S103, Detecting a port state of an output port of a safety drive unit when the drive command changes.

S104, Performing a corresponding processing operation according to the port state of the output port. Steps S102 to S104 are repeated.

In this embodiment, taking the safety drive unit main system as an example, the port state of the output port of the safety drive unit is determined based on the open/closed states of the output switch A1 and the output switch B1. The hardware reads back the electrical levels on the output switch A1 and the output switch B1, and determines whether the switches can be opened/closed normally according to the permutation and combination. For example, when the output switch A1 and the output switch B1 are both closed, there is a high electrical level on each of them. When the output switch A1 is closed and the output switch B1 is open, there is a low electrical level on the output switch A1 and a high electrical level on the output switch B1. Therefore, the external detection loop is affected by another series of induced electromotive force, and a positive/negative level is superimposed in the detection loop, resulting in an error in the readback electrical level.

Step S104 specifically includes:

S201, in the safety drive unit main system, which is taken as an example, when the port states are detected to be normal, enabling the switches, that is, the output switch A1 and the output switch B1 at the output ports of the safety drive unit to perform actions, and enabling the safety drive unit main system to perform external output operations, where the same goes for the safety drive unit standby system. That is, when the port state is not abnormal, the safety drive unit performs a corresponding operation according to the drive command.

Specifically, the enabling the safety drive unit to perform external output operations includes that the safety drive unit drives a corresponding relay externally or stops driving it according to a drive command.

When the drive command of the safety communication module changes from "stop" to "drive", and the safety drive unit main system or safety drive unit standby system first detects the port states, because the relay is not energized, and no induced electromotive force is generated at the iron core, the detection is passed, and external output operation is performed to drive the relay. Because the relay is driven without delay, the safety drive unit reacted later is disturbed by the magnetic core when detecting the port state, resulting an abnormal detection result, which can be avoided by using the processing method of the present invention.

Further, the processing method for preventing electromagnetic induction when a main system and a standby system of a safety drive unit co-drive a relay in the present invention further includes a safety side processing method, that is, step S104 further includes:

S202, In the safety drive unit main system, which is taken as an example, when the port state is detected to be abnormal, and if the drive command changes from "stop" to "drive" and a current cycle is within a set forgiveness cycle, ignoring a current detection result of this cycle, closing the output switch A1, opening the output switch B1, enabling the safety drive unit main system not to perform external driving operations, and waiting for a next cycle to detect again, where the same goes for the safety drive unit standby system.

Further, the method further includes: in the safety drive unit main system, which is taken as an example, when the port state is detected to be normal within the set forgiveness cycle, closing the output switch B1, and enabling the safety drive unit main system to perform external output operations, where the same goes for the safety drive unit standby system.

In the present invention, the forgiveness cycle is introduced, and its duration is N detection cycles, and a different forgiveness period can be set according to a relay in a different size. The safety drive unit main system is used as an example. When the port state is detected to be abnormal, and the drive command changes from "stop" to "drive", within a duration (N detection cycles), it is allowed that the output switch A1 is closed and the output switch B1 is open, and the safety drive unit main system does not enter an unavailable state and waits for the next cycle to detect again. The same goes for the safety drive unit standby system.

S203, in the safety drive unit main system, which is used as an example, when the port state is detected to be abnormal, and if the drive command changes from "stop" to "drive", and the current cycle is out of the forgiveness cycle, opening the output switch A1 and the output switch B1, and enabling the safety drive unit main system to cut off all outputs to enter an unavailable state, where the same goes for the safety drive unit standby system.

It can be known from the above that during the forgiveness cycle, some switches of the safety drive unit are kept closed, which eliminates repeated opening and closing steps, reduces noise, and improves the life of the on-board relay.

S204, In the safety drive unit main system, which is used as an example, when the port state is detected to be abnormal, and if the drive command changes from "drive" to "stop", opening the output switch A1 and the output switch B1, and enabling the safety drive unit main system to cut off the output thereof to enter an unavailable state, where the same goes for the safety drive unit standby system.

In summary, in the processing method for preventing electromagnetic induction when a main system and a standby system of a safety drive unit co-drive a relay of the present invention, the safety drive unit first detects a port state of an output port when a drive command changes, and performs the next processing operation according to the port state. The safety drive unit performs external driving operations only after the port state is normal. After the port state is detected to be abnormal, the safety drive unit is guided to a safety side method and cuts off the external outputs, to realize the safe outputs of the safety drive unit through further determining.

Further, in the processing method for preventing electromagnetic induction when a main system and a standby system of a safety drive unit co-drive a relay of the present invention, the forgiveness cycle is set. When the drive command changes from "stop" to "drive," to further ensure the safety, within the forgiveness cycle, if the port state is abnormal, the detection result of the current cycle is ignored, and the external output operation is not performed. Outside the forgiveness cycle, if the port state is abnormal, the board card enters an unavailable state. That is, the method takes effect only when the port is closed, and does not take effect when the switch at the port is open, without increasing the safety reaction time, to further ensure the driving safety.

Although the content of the present invention is described in detail in the foregoing preferred embodiments, it should be known that the foregoing description should not be construed as a limitation on the present invention. Various modifications and alternatives to the present invention are apparent to those skilled in the art upon reading the foregoing. Therefore, the protection scope of the present invention should be defined by the appended claims.

The invention claimed is:

1. A processing method for preventing electromagnetic induction when a main system and a standby system of a safety drive unit co-drive a relay, comprising: (a) periodically acquiring and detecting a drive command; (b) detecting a port state of an output port of the safety drive unit when the drive command changes; and (c) performing a corresponding processing operation according to the port state of the output port; and (d) repeating steps (a)-(c); the safety drive unit comprises a safety drive unit main system and a safety drive unit standby system, wherein the safety drive unit main system is connected to a first coil via a first output switch and a second output switch, and the safety drive unit standby system is connected to a second coil via a third output switch and a fourth output switch, and a control logic of the safety drive unit main system is the same as a control logic of the safety drive unit standby system; the first coil connected to the safety drive unit main system and the second coil connected to the safety drive unit standby system are wound on a same iron core, and the relay can be driven in case any one of safety drive units performs external output operations; wherein the step of performing the corresponding processing operation comprises: in the safety drive unit main system, when the port state is detected to be abnormal, and in the case where the drive command changes from "stop" to "drive" and such a cycle is within a set forgiveness cycle, ignoring a current detection result of this cycle, closing the first output switch, opening the second output switch, enabling the safety drive unit main system not to perform external driving operations, and waiting for a next cycle to detect again; in the safety drive unit main system, when the port state is detected to be normal within the set forgiveness cycle, closing the second output switch, and enabling the safety drive unit main system to perform external output operations; in the safety drive unit main system, when the port state is detected to be abnormal, and in the case where the drive command changes from "stop" to "drive" and such a cycle is out of the set forgiveness cycle, opening the first output switch and the second output switch, and enabling the safety drive unit main system to cut off the output thereof to enter an unavailable state; and in the safety drive unit main system, when the port state is detected to be abnormal, and in the case where the drive command changes from "drive" to "stop," opening the first output switch and the second output switch, and enabling the safety drive unit main system to cut off the output thereof to enter an unavailable state.

2. The processing method for preventing electromagnetic induction when the main system and the standby system of the safety drive unit co-drive the relay according to claim 1, wherein the step of performing the corresponding processing operation comprises:

when the port state is detected to be normal, enabling all switches at the output ports of the safety drive unit to perform actions, enabling the safety drive unit to perform external output operations, and repeating the step of detecting the port state.

3. The processing method for preventing electromagnetic induction when the main system and the standby system of the safety drive unit co-drive the relay according to claim 2, wherein:

the enabling the safety drive unit to perform external output operations comprises that the safety drive unit performs external driving operations or stops performing external driving operations according to a drive command.

4. The processing method for preventing electromagnetic induction when the main system and the standby system of the safety drive unit co-drive the relay according to claim 1, wherein before the step of periodically acquiring and detecting the drive command, the processing method further comprises:

enabling the safety drive unit to load configuration data and to initialize hardware and software resources.

* * * * *